(12) United States Patent
Frank

(10) Patent No.: US 8,176,294 B2
(45) Date of Patent: May 8, 2012

(54) REDUCING STORAGE EXPANSION OF A VIRTUAL MACHINE OPERATING SYSTEM

(75) Inventor: Shahar Frank, Ramat Hasharon (IL)

(73) Assignee: Red Hat Israel, Ltd., Raanana (IL)

( * ) Notice: Subject to any disclaimer, the term of this patent is extended or adjusted under 35 U.S.C. 154(b) by 404 days.

(21) Appl. No.: 12/419,259

(22) Filed: Apr. 6, 2009

(65) Prior Publication Data

US 2010/0257331 A1    Oct. 7, 2010

(51) Int. Cl.
*G06F 12/00* (2006.01)

(52) U.S. Cl. ............ 711/202; 711/6; 711/112; 711/156; 711/170; 711/162

(58) Field of Classification Search .................. 711/202, 711/6, 112, 156, 170, 162
See application file for complete search history.

(56) References Cited

U.S. PATENT DOCUMENTS

2007/0226451 A1*    9/2007    Cheng et al. .................. 711/203

OTHER PUBLICATIONS

Qumranet, Solid ICE™, Connection Broker, Apr. 2008, 7 pages.
Qumranet, KVM-Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Virtual Desktop Server (VDS), Apr. 2008, 6 pages.

* cited by examiner

*Primary Examiner* — Thong Q Le
(74) *Attorney, Agent, or Firm* — Lowenstein Sandler PC

(57) ABSTRACT

Storage expansion for a virtual machine operating system is reduced. In one embodiment, virtual machines are run on a host and accessed by remote clients over a network. When a guest operating system on one of the virtual machines deletes a file, a VM storage manager on the host detects a special write performed by the guest operating system that writes zeros into a logical block of the file. The VM storage manager links the logical block to a designated block, and de-allocates the disk block that is mapped to the logical block. The de-allocation allows the disk block to be reused by the virtual machines.

20 Claims, 5 Drawing Sheets

REDUCING STORAGE EXPANSION OF A VIRTUAL MACHINE OPERATING SYSTEM

TECHNICAL FIELD

Embodiments of the present invention relate to management of virtual machines, and more specifically, to the management of disk storage for virtual machine operating systems.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

In some systems, the host is a centralized server that is partitioned into multiple virtual machines to provide virtual desktops to the users. The centralized host manages the allocation of disk storage to the virtual machines. Some hosts pre-allocate a fixed amount of disk storage to each virtual machine. However, the guest operating system of a virtual machine often expands and outgrows the pre-allocated storage space. One reason for the expansion is that a conventional guest operating system does not reuse the block of a deleted file once the file is deleted. Rather, the reclaim of the block is usually delayed. This means that the guest operating system will allocate other disk blocks, instead of reusing the blocks of the deleted files. The lack of block reuse can waste a significant amount of space at the host level. As a result, the accumulation of the blocks of deleted files in the disk storage can reduce the speed of disk backup operations.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
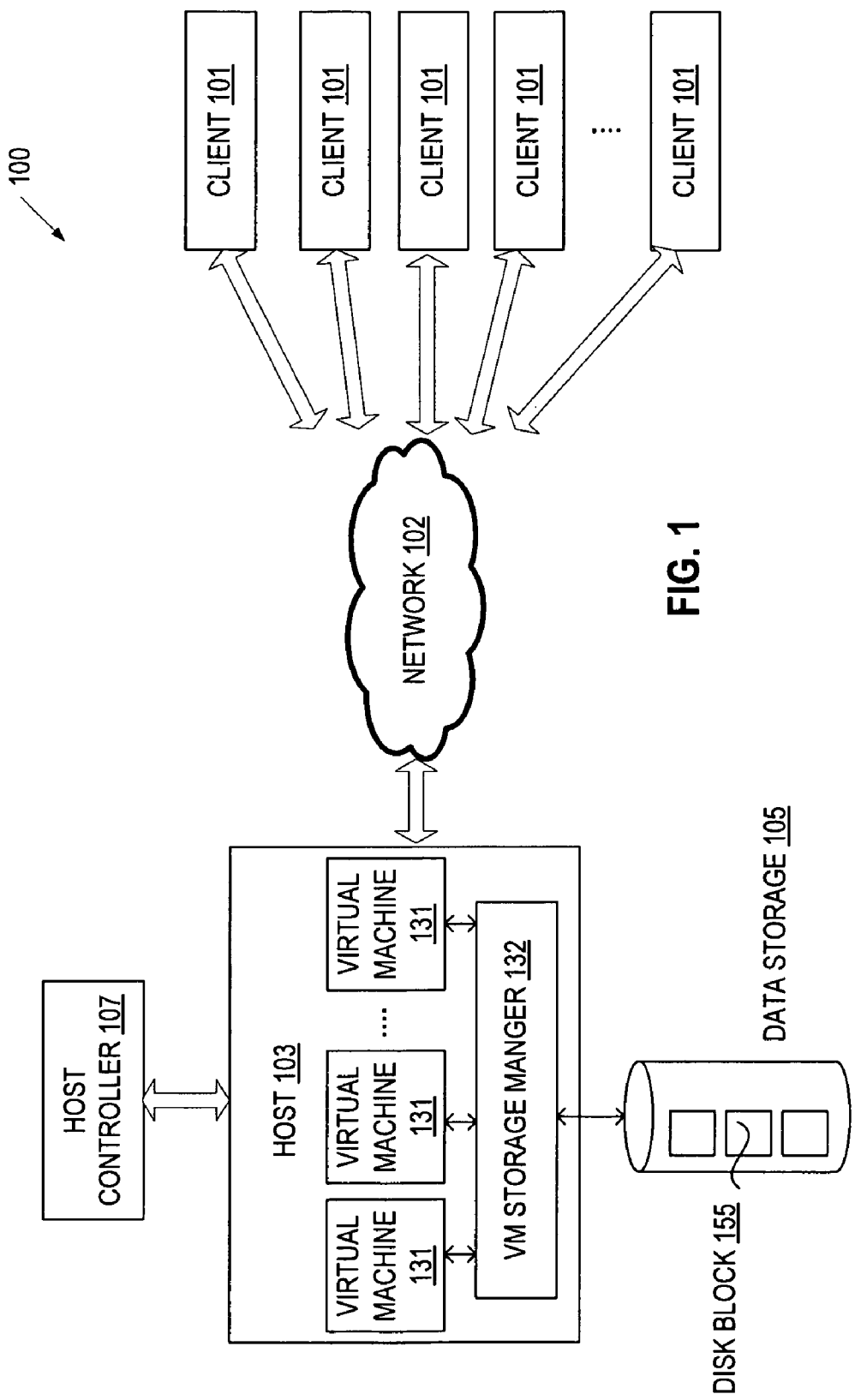
FIG. 1 illustrates an exemplary network architecture in which embodiments of the present invention may operate.

Described herein is a method and system for reducing storage expansion of a virtual machine. In one embodiment, virtual machines are run on a host and accessed by remote clients over a network. When a guest operating system on one of the virtual machines deletes a file, a VM storage manager on the host detects a special write performed by the guest operating system that writes zeros into a logical block of the file. The VM storage manager links the logical block to a designated block, and de-allocates the disk block that is mapped to the logical block. The de-allocation allows the disk block to be reused by the virtual machines. The designated block may be a disk block containing all zeros. The link to the designated block indicates that the disk block has been released by the guest operating system and can be re-allocated for other use.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "deleting", "de-allocating", "linking", "modifying", "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 include a host 103 coupled to one or more clients 101 over a network 102. The network 102 may be a private network (e.g., a local area network (LAN), wide area network (WAN), intranet, etc.) or a public network (e.g., the Internet). The host 103 is also coupled to a data storage 105. In addition, the host 103 may be coupled to a host controller 107 (via a network or directly). Alternatively, the host controller 107 may be part of the host 103.

In one embodiment, the clients 101 may include computing devices that have a wide range of processing capabilities. Some or all of the clients 101 may be thin clients, which serve as access terminals for users and depend primarily on the host 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications to receive multimedia data streams or other data sent from the host 103 and re-direct the received data to a display or other user interface.

In one embodiment, the host 103 includes a server or a cluster of servers to run one or more virtual machines 131. Each virtual machine 131 runs a guest operating system (OS) that may be different from one another. The guest OS may include Microsoft Windows, Linux, Solaris, Mac OS, etc. The host 103 may include a hypervisor (not shown) that emulates the underlying hardware platform for the virtual machines 131. The hypervisor may also be known as a virtual machine monitor (VMM), a kernel-based hypervisor or a host operating system.

Each virtual machine 131 can be accessed by one or more of the clients 101 over the network 102. In one scenario, the virtual machine 131 can provide a virtual desktop for the client 101. The image of the virtual machine 131 can be stored by the host 103 in the data storage 105. The virtual machines 131 can be managed by the host controller 107. The host controller 107 may also add a virtual machine, delete a virtual machine, balance the load on the server cluster, provide directory service to the virtual machines 131, and perform other management functions.

In one embodiment, the host 103 includes a virtual machine (VM) storage manager 132 that may be part of the hypervisor or be controlled by the hypervisor. The VM storage manager 132 serves as an interface to the virtual machines 131 and data storage 105. In one embodiment, the VM storage manager 132 allocates and de-allocates disk blocks 155 (or, interchangeably, physical blocks) in data storage 105 for the virtual machines 131.

De-allocation of a disk block occurs when a file is deleted by a guest OS. In one embodiment, the guest OS on each virtual machine 131 manages a file system and maintains a data structure, such as a table, to record a mapping between the files and the corresponding logical blocks. The VM storage manager 132 maintains another data structure, such as a table, to record the mapping between the logical blocks and physical disk blocks 155. When a file is deleted, the guest OS updates its table to indicate the file deletion and the availability of the corresponding logical blocks. The VM storage manager 132 provides the mechanism for disk block de-allocation, such that the disk blocks 155 freed by one virtual machine 131 can be re-allocated to the same or another virtual machine 131. With the de-allocation mechanism, the host 103 is able to recognize those disk blocks 155 that are re-allocatable. Thus, the de-allocation mechanism prevents storage expansion of the guest OS and facilitates efficient utilization of disk blocks 155. The de-allocation mechanism will be described in greater detail with references to FIGS. 2 and 3.

Figure 2:
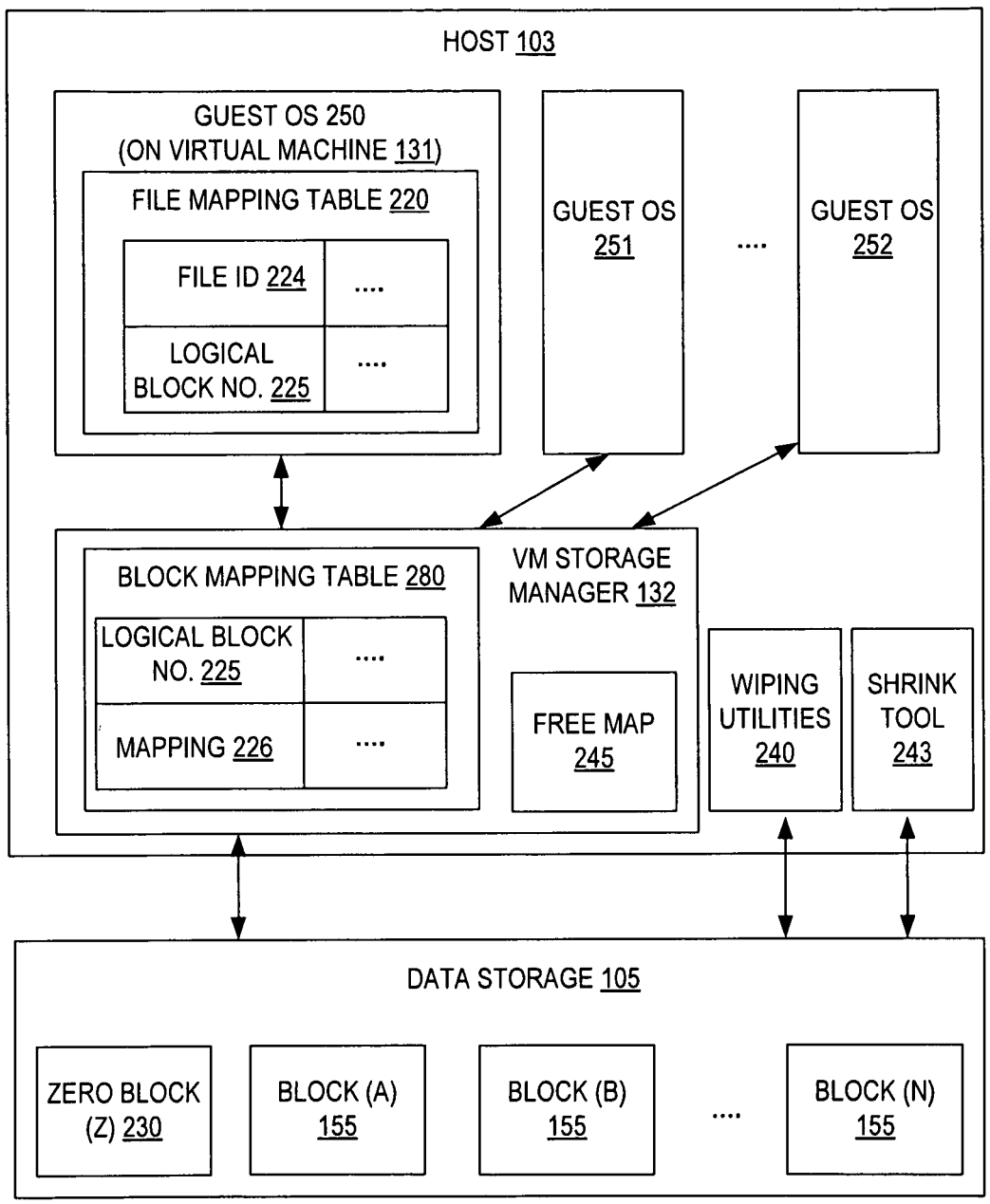
FIG. 2 is a block diagram illustrating one embodiment of a virtual machine and a VM storage manager.

FIG. 2 is a block diagram that shows the VM storage manager 132 as an interface between a number of guest operating systems and the data storage 150 according to one embodiment of the present invention. The guest operating systems 250, 251 and 252 can be any operating systems, such as Microsoft Windows, Linux, Solaris, Mac OS, etc. Each guest OS 250, 251 or 252 runs on one of the virtual machines 131 on the host 103, and manages a file system for its associated virtual machine 131. For simplicity of the discussion, only the guest OS 250 will be described. However, it is understood that the same disk block de-allocation and re-allocation techniques can be applied to any other guest OS on the host 103.

In this embodiment, the guest OS 250 maintains a file mapping table 220, which records a mapping between a file identifier (ID) 224 and one or more logical disk block numbers 225 corresponding to the file. When a file is deleted, the guest OS 250 performs a special write into the blocks of the deleted file. In some conventional systems, the operating system writes zeros into the blocks of the deleted file. However, these blocks of zeros cannot be distinguished from regular data blocks and cannot be easily reused by the host 103. According to one embodiment of the invention, the special write performed by the guest OS 250 can be an explicit verb to free the storage space of a block. Alternatively, wiping utilities 240 can be used to provide the special write. The wiping utilities 240 are security-based utilities that can be used to wipe out deleted files by writing a special pattern over the blocks of the deleted files. The wiping operation is performed to disallow users from recovering a deleted file. The special pattern can be a block of all zeros. When the VM storage manager 132 detects the explicit verb or the wiping operations performed by the wiping utilities 240, the VM storage manager 132 is alerted that the space of the block that is subject to the special write can be reclaimed.

When the VM storage manager 132 detects the special write, it locates the (physical) disk blocks 155 that are subject to the special write in the data storage 105, and marks these physical blocks as reusable. The VM storage manager 132 links the logical blocks of the deleted file to a designated disk block, such as a zero block 230. The link to the zero block 230 indicates that the logical blocks belong to a deleted file. The link to the zero block 230 is at the logical block mapping level. The VM storage manager 132 also maintains a free map 243 that contains the physical disk blocks 155 that can be allocated to the guest operating systems 250-252. In one embodiment, the VM storage manager 132 can link a logical block to the zero block 230 by modifying the metadata of the logical block, for example, by adding a reference to the identifier of the zero block 230 or a pointer to the location of the zero block 230.

In the embodiment of FIG. 2, the VM storage manager 132 maintains a physical (storage view) to a logical (guest view) mapping, such as the block mapping table 280. The block mapping table 280 includes the logical block number 225 and a mapping 226 of the logical blocks. Each logical block is mapped to a physical block in data storage 105. When the VM storage manager 132 identifies a special write to a logical block, the VM storage manager 132 links the logical block to the designated zero block 230 by updating the mapping 226 of the logical block in the block mapping table 280.

To improve the efficiency of data storage, in one embodiment, logical blocks are mapped to the physical blocks of a corresponding backing file. Thus, a file (or, interchangeably, an image) will contain only those blocks that are different from its backing file. When new data is written to a block of the file that is mapped to the backing file, a copy-on-write mechanism can be used to direct the new data to another block. In the following examples, various mapping tables are shown to illustrate embodiments of the present invention. However, it is understood that the mapping tables below are for illustration purposes and details shown below may vary from the block mapping table 280 of the VM storage manager 132.

For example, if a backing image (B) have the following mapping between a logical block and the corresponding data block:

TABLE 1

| | Logical block no. | | | | |
|---|---|---|---|---|---|
| | 1 | 2 | 3 | 4 | 5 |
| Data block | A | B | C | D | E |

An image (I1) having exactly the same content as the backing image will have the following mapping, where "." indicates no mapping exists for a logical data block:

TABLE 2

| | Logical block no. | | | | |
|---|---|---|---|---|---|
| | 1 | 2 | 3 | 4 | 5 |
| Mapping | . | . | . | . | . |
| Data block | . | . | . | . | . |

That is, image I1 will start as an image with empty mappings and empty data. When a logical block does not have a mapping in the mapping table, it means that the logical block will use the physical block (corresponding to the same logical block number) from the backing file. If, for example, the content of logical block 2 is changed by having new data block N written to it, the VM storage manager 132 will perform a copy-on-write to this block. This copy-on-write can be done by allocating a free physical block to image I1, and changing the mappings of logical block 2 to point to physical block 1 within image I1.

TABLE 3

| | Logical block no. | | | | |
|---|---|---|---|---|---|
| | 1 | 2 | 3 | 4 | 5 |
| Mapping | . | 1 | . | . | . |
| Data block | N | . | . | . | . |

At this point, reading any block except logical block 2 will return the physical block from the backing image (B), but reading logical block 2 returns the data block (N) stored on the physical block 1 inside image I1. From the above example, it can be noted that image I1 includes 5 logical blocks, but only one data block is actually stored in I1 and all other blocks are merely a reference to the blocks stored in the backing image B. Thus, the physical data space of a file can be different in size from the logical data space and size of the file.

Now assume that an image I2 has the following mapping:

TABLE 4

| | Logical block no. | | | | | | | | |
|---|---|---|---|---|---|---|---|---|---|
| | 1 | 2 | 3 | 4 | 5 | 6 | 7 | 8 | 9 |
| Mapping | . | 3 | 4 | 2 | . | 5 | . | . | . |
| Data block | Z | A | B | C | D | | | | |

The first data block is a zero block. In a conventional system, writing a zero block into logical block 4 would cause image I2 to contain two zero blocks as follows:

TABLE 5

| | Logical block no. | | | | | | | | |
|---|---|---|---|---|---|---|---|---|---|
| | 1 | 2 | 3 | 4 | 5 | 6 | 7 | 8 | 9 |
| Mapping | . | 3 | 4 | 2 | . | 5 | . | . | . |
| Data block | Z | Z | B | C | D | | | | |

However, when the VM storage manager 132 identifies a zero block write into logical block 4, it interprets the zero block write as an indication of de-allocating the space of logical block 4. To make such deallocation safe, the mapping of logical block 4 will be updated to pointed to the zero block (Z) with a COW (copy-on-write) flag. This makes any future read from logical block 4 to return a zero block. Any future write to logical block 4 will cause the system to allocated a new physical block, and to map logical block 4 to the new physical block. The space occupied by logical block 4 (i.e., physical block 2, as indicated by the mapping (2) in the same column of logical block number 4) can be marked as free, and can be reused for any further allocations. Thus, the following mapping will result:

TABLE 6

| | Logical block no. | | | | | | | | |
|---|---|---|---|---|---|---|---|---|---|
| | 1 | 2 | 3 | 4 | 5 | 6 | 7 | 8 | 9 |
| Mapping | . | 3 | 4 | 2 | . | 5 | . | . | . |
| Data block | Z | . | B | C | D | | | | |

A subsequent write (e.g., of a data block E) to logical block 1 can use the space of physical block 2 instead of expanding the data set of image I2:

TABLE 7

| | Logical block no. | | | | | | | | |
|---|---|---|---|---|---|---|---|---|---|
| | 1 | 2 | 3 | 4 | 5 | 6 | 7 | 8 | 9 |
| Mapping | 2 | 3 | 4 | 1 | . | 5 | . | . | . |
| Data block | Z | E | B | C | D | | | | |

At this point, any write to a block linked to the special zero block (physical block 1) will result in a copy-on-write operation. That is, the link to the zero block will be removed and the new data will be copied to another block (e.g., a newly allocated physical block). For example, writing data block F to logical block 4 results:

TABLE 8

| | Logical block no. | | | | | | | | |
|---|---|---|---|---|---|---|---|---|---|
| | 1 | 2 | 3 | 4 | 5 | 6 | 7 | 8 | 9 |
| Mapping | 2 | 3 | 4 | 6 | . | 5 | . | . | . |
| Data block | Z | E | B | C | D | F | | | |

Using the zero block 230 as described above, the disk blocks 155 corresponding to a deleted file (also referred to as the freed disk blocks) can be re-allocated to the same virtual machine that deletes the file. Some additional utilities can be used to pool together the freed disk blocks from all virtual machines and to re-allocate those blocks to any virtual machine on the host 103. For example, some file systems (e.g., the XFS file system which was originally developed by Silicon Graphics, Inc.) support special block free verbs that make internally freed blocks available across virtual machines 131. This is because each image maintains its own separate storage object. Blocks that are free within one storage object are usually not available to other storage objects unless special file system verbs are used (such as the XFS reclaim verbs). Alternatively, a shrink tool 243 can be used to copy existing data (non-zero data) in a current file to a new file, and free the blocks that were assigned to the current file but were not used. The space of the freed blocks can be reused by any virtual machine 131 on the host 103. The effect of the shrink tool 243 is shown below, using an example of an image I3 that has the following mapping:

TABLE 9

| | Logical block no. | | | | | | | | |
|---|---|---|---|---|---|---|---|---|---|
| | 1 | 2 | 3 | 4 | 5 | 6 | 7 | 8 | 9 |
| Mapping | 2 | 1 | 1 | 6 | . | . | 3 | . | . |
| Data block | Z | E | . | C | . | F | | | |

The data size of image I3 as shown above is 6 blocks. After the shrink tool 243 performing a shrink operation, the mapping of image I3 will become as follows:

TABLE 10

| | Logical block no. | | | | | | | | |
|---|---|---|---|---|---|---|---|---|---|
| | 1 | 2 | 3 | 4 | 5 | 6 | 7 | 8 | 9 |
| Mapping | 2 | 1 | 1 | 3 | . | . | 4 | . | . |
| Data block | Z | E | C | F | | | | | |

As explained in the above examples, the use of zero block 230 helps the VM storage manager 132 to correctly interpret whether a logical block without a mapping is corresponding to a base file or a deleted file. The VM storage manager 132 protects the zero block 230 from being overwritten by performing a "copy-on-write" operation. Any attempt to overwrite the zero block 230, or to write data into a block linked to the zero block, will be re-directed to another block in the data storage 105 that is available for allocation/re-allocation. For example, if one of the virtual machines 131 attempts to write data into the zero block 230, the VM storage manager 132 will copy the data to another disk block without informing the virtual machine of the re-direction.

In the embodiment of FIG. 2, the host 103 can run wiping utilities 240 to scan the data storage 105, and to zero out those disk blocks that are linked to the zero block 230. The wiping utilities 240 can be run periodically or upon command. The use of the wiping utilities 240 addresses a data security issue, which occurs when a deleted file contains sensitive information. The wiping utilities 240 ensures that the data of a deleted file will be overwritten by zeros at a pre-determined time. Without the wiping utilities 240, the data of a deleted file may remain in the data storage 105 indefinitely.

Figure 3:
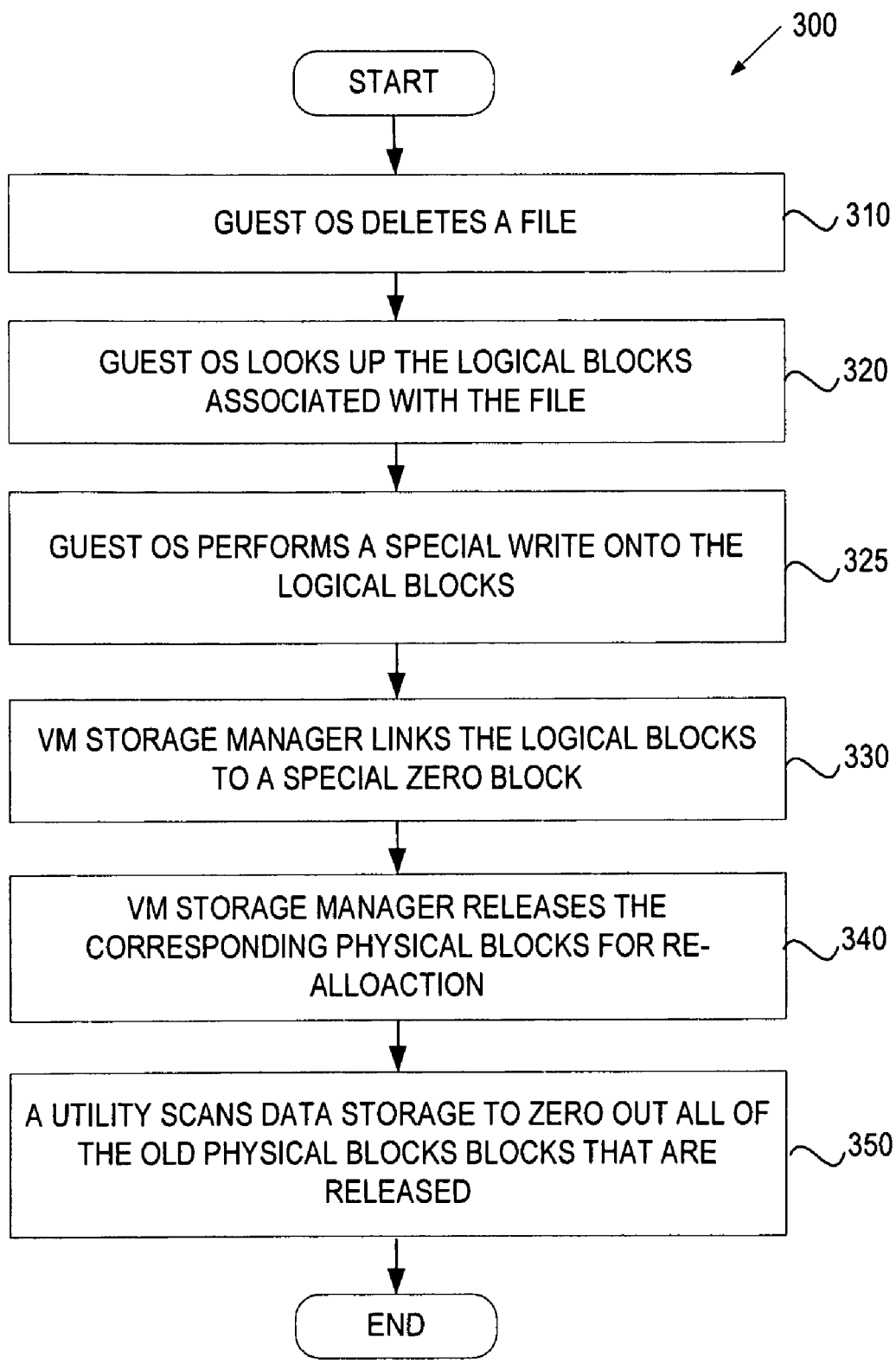
FIG. 3 is a flow diagram illustrating a method for de-allocating a disk block in accordance with one embodiment of the present invention.

FIG. 3 is a flow diagram illustrating one embodiment of a method 300 for deallocating disk blocks of a deleted file. The method 300 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 300 is performed by the VM storage manager 132 and the guest operating system 250 on the host 103 (FIGS. 1 and 2).

Referring to FIG. 3, in one embodiment, the method 300 begins with the guest OS 250 deleting a file (block 310). The guest OS 250 looks up a data structure, such as the file mapping table 220 of FIG. 2, to determine the logical blocks corresponding to the deleted file (block 320). The guest OS 250 then performs a special write onto the logical blocks (block 325). The VM storage manager 132 detects the special write and links the logical blocks to a designated block, such as the zero block 230 of FIG. 2 (block 330). At this point, the physical blocks that were previously mapped to the logical blocks are released for re-allocation (block 340). Periodically or upon command, a utility (e.g., the wiping utilities 240 of FIG. 2) can be used to zero out these released physical blocks that should have been overwritten with zero values by the special write (block 350). The zero writes protect sensitive information stored in the disk blocks of deleted files.

Figure 4:
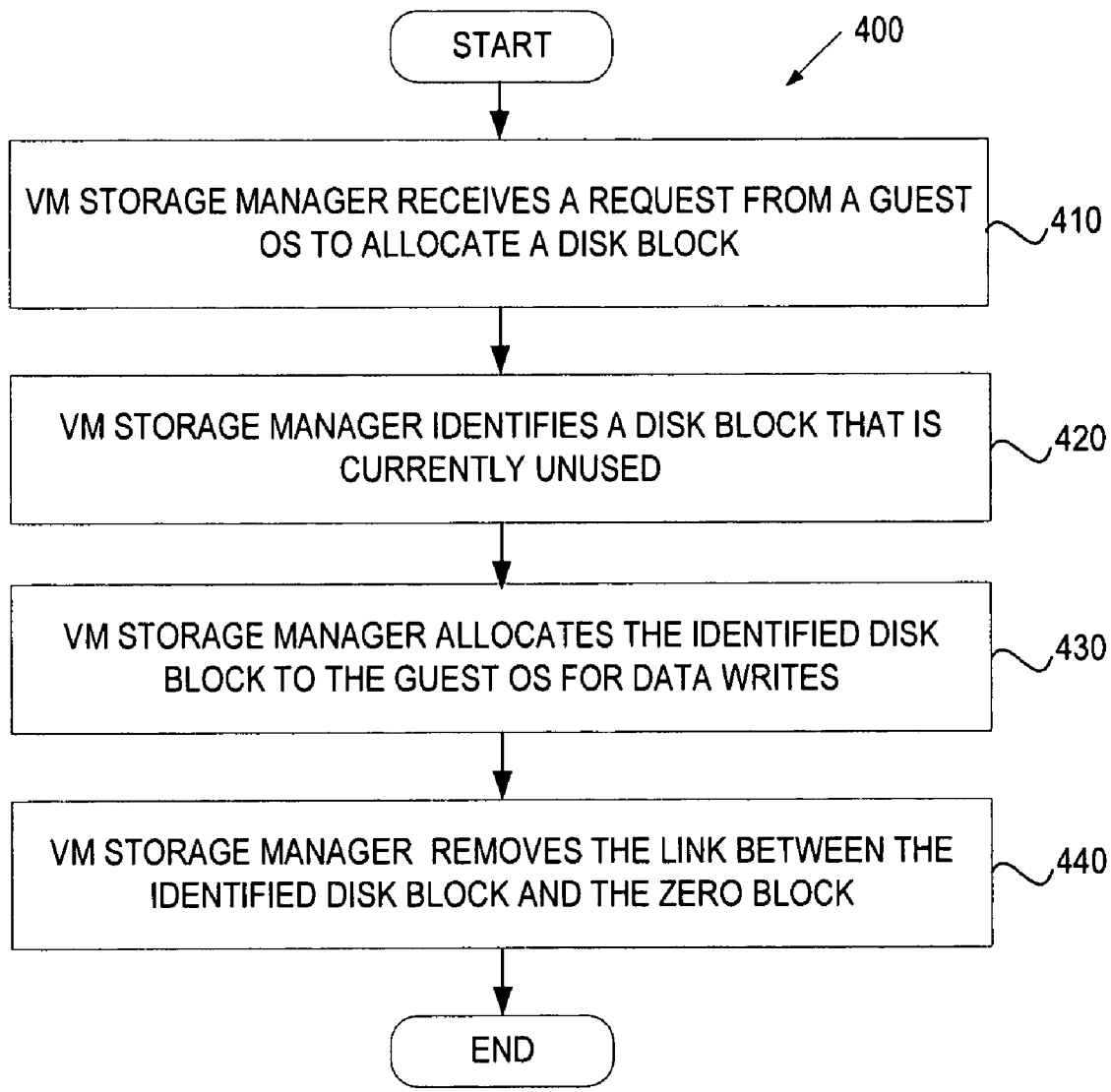
FIG. 4 is a flow diagram illustrating a method for re-allocating a disk block in accordance with one embodiment of the present invention.

FIG. 4 is a flow diagram illustrating one embodiment of a method 400 for re-allocating a disk block of a deleted file. The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the VM storage manager 132 on the host 103 (FIGS. 1 and 2).

Referring to FIG. 4, in one embodiment, the method 400 begins with the VM storage manager 132 receiving a request from a guest OS to allocate a (physical) disk block (block 410). Upon receiving the request, the VM storage manager 132 identifies a disk block in data storage that is currently unused (block 420). The disk block may be a physical block that is released from a deleted file. The VM storage manager 132 then allocates the disk block, by updating its block mapping table (block 430). The VM storage manager 132 also removes the link between the allocated disk block and the zero block 230 to indicate that the disk block is no longer zero (block 440).

Figure 5:
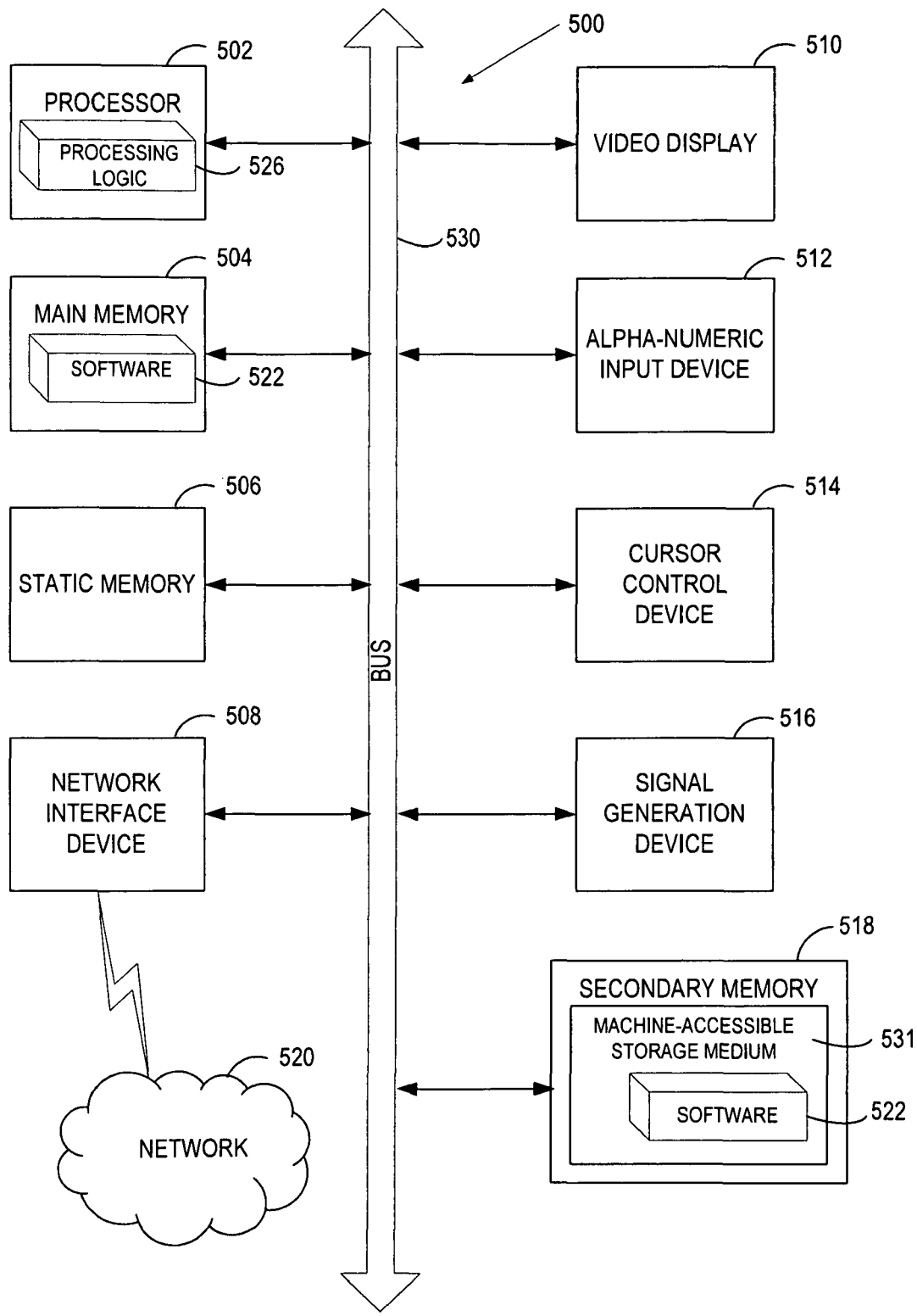
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server (e.g., the host 103) or a client machine (e.g., the client 101) in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the guest OS 250 and VM storage manager 132 of FIGS. 1 and 2. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
   detecting, by a virtual machine (VM) storage manager of a hypervisor hosted by a server, a write performed by a guest operating system to delete a file, wherein the write performed by the guest operating system is indicated by a predefined pattern in a logical block of the file to be deleted, the guest operating system running on one of a plurality of virtual machines hosted by the server;
   linking, by the VM storage manager, the logical block to a designated block corresponding to at least one physical block; and
   de-allocating the at least one physical block for reuse by the plurality of virtual machines.

2. The method of claim 1, further comprising:
   maintaining a block mapping table to indicate a mapping between logical blocks and physical blocks, wherein the logical blocks without a mapping are mapped to a backing file.

3. The method of claim 1, wherein de-allocating further comprises:
   modifying metadata of the physical block to point to the designated block that contains zeros.

4. The method of claim 1, further comprising:
   overwriting the physical block corresponding to the logical block with zeros subsequent to de-allocation of the physical block.

5. The method of claim 1, further comprising:
   receiving a request to write the logical block that is linked to the designated block; and
   allocating another physical block in data storage for the request.

6. The method of claim 1, further comprising:
   receiving a request from one of the plurality of virtual machines to allocate a new physical block; and
   allocating the new physical block in response to the request.

7. The method of claim 1, wherein the plurality of virtual machines provide virtual desktops to remote clients over a network.

8. The method of claim 1, further comprising:
re-allocating the physical block to the guest operating system.

9. A system comprising:
data storage to store a plurality of disk blocks; and
a host coupled to the data storage to run a hypervisor and a plurality of virtual machines (VMs), each virtual machine running a guest operating system; wherein the hypervisor further comprises a VM storage manager that detects a write performed by the guest operating system to delete a file, wherein the write performed by the guest operating system is indicated by a predefined pattern in a logical block of the file to be deleted, links the logical block to a designated block corresponding to at least one physical block, and de-allocates the at least one physical block for reuse by the plurality of virtual machines.

10. The system of claim 9, wherein the designated block comprises a zero block that is linked to the logical block of the file.

11. The system of claim 9, wherein each of the physical blocks corresponding to the deleted file contains metadata that is modified by the VM storage manager to point to the designated block.

12. The system of claim 9, further comprising:
data wiping utilities to zero out the physical block corresponding to the logical block subsequent to de-allocation of the physical block.

13. The system of claim 9, wherein the host includes a cluster of servers.

14. A computer readable storage medium including instructions that, when executed by a processing system, cause the processing system to perform a method comprising:
detecting, by a virtual machine (VM) storage manager of a hypervisor hosted by a server, a write performed by a guest operating system to delete a file, wherein the write performed by the guest operating system is indicated by a predefined pattern in a logical block of the file to be deleted, the guest operating system running on one of a plurality of virtual machines hosted by the server;
linking, by the VM storage manager, the logical block to a designated block corresponding to at least one physical block; and
de-allocating the at least one physical block for reuse by the plurality of virtual machines.

15. The computer readable storage medium of claim 14, wherein the method further comprises:
maintaining a block mapping table to indicate a mapping between logical blocks and physical blocks, wherein the logical blocks without a mapping are mapped to a backing file.

16. The computer readable storage medium of claim 14, wherein de-allocating further comprises:
modifying metadata of the physical block to point to the designated block that contains zeros.

17. The computer readable storage medium of claim 14, wherein the method further comprises:
overwriting the physical block corresponding to the logical block with zeros subsequent to de-allocation of the physical block.

18. The computer readable storage medium of claim 14, wherein the method further comprises:
receiving a request to write the logical block that is linked to the designated block; and
allocating another physical block in data storage for the request.

19. The computer readable storage medium of claim 14, wherein the method further comprises:
receiving a request from one of the plurality of virtual machines to allocate a new physical block; and
allocating the new physical block in response to the request.

20. The computer readable storage medium of claim 14, wherein the method further comprises:
re-allocating the physical block to the guest operating system.

* * * * *